May 14, 1929.  W. CASBON  1,713,419
TONE ARM
Filed Aug. 31, 1928  2 Sheets-Sheet 1
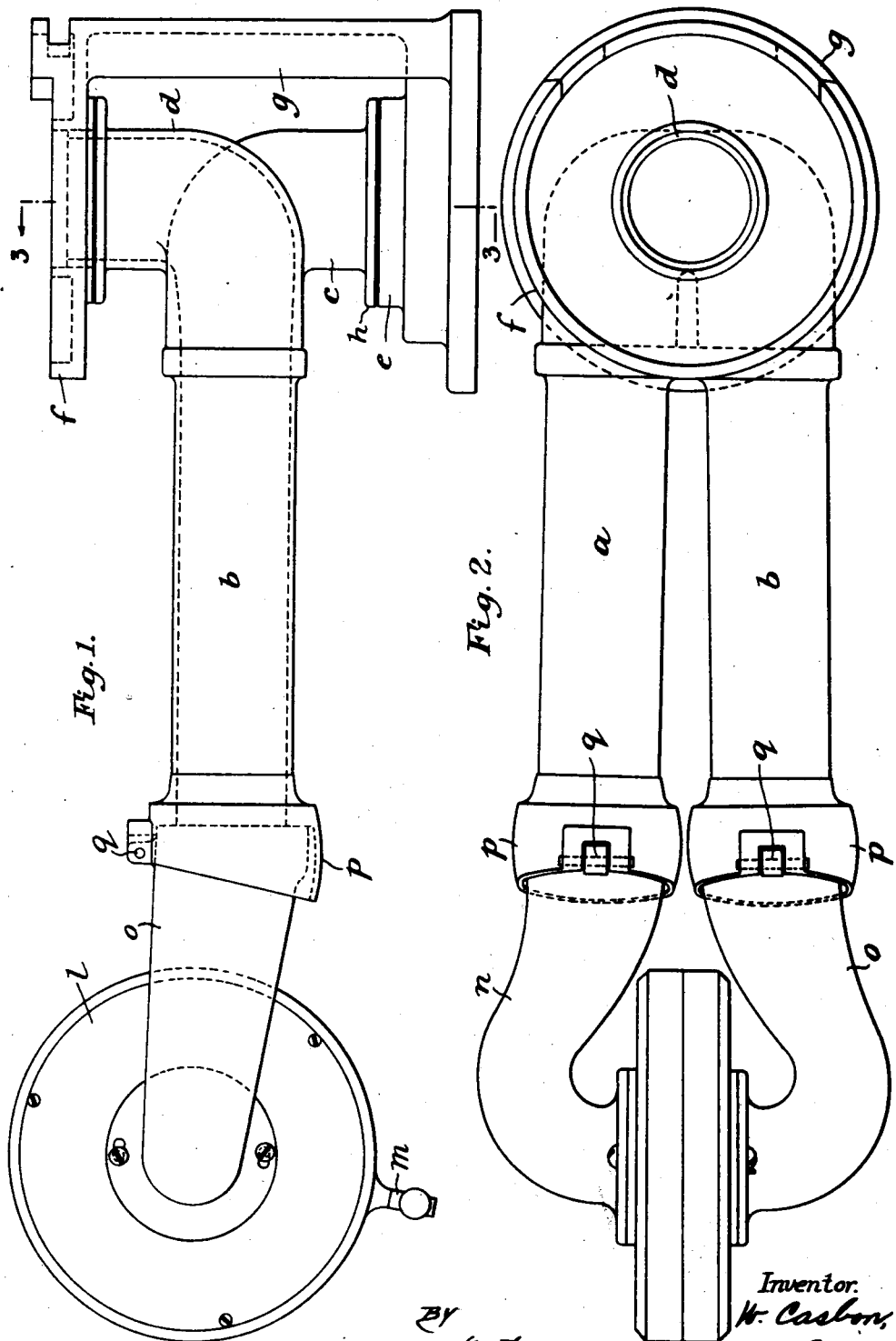

May 14, 1929.  W. CASBON  1,713,419
TONE ARM
Filed Aug. 31, 1928  2 Sheets-Sheet 2

Patented May 14, 1929.

1,713,419

UNITED STATES PATENT OFFICE.

WILLIAM CASBON, OF LONDON, ENGLAND, ASSIGNOR TO YAGERPHONE LIMITED, OF LONDON, ENGLAND.

TONE ARM.

Application filed August 31, 1928, Serial No. 303,281, and in Great Britain May 5, 1927.

This invention relates to gramophones of the kind in which two separate tone-arms are connected respectively at one end to two separate reproducers or sound-boxes, or to the independent chambers of a single reproducer or sound-box, with the diaphragm of each sound-box or chamber actuated by a common stylus, the other ends of the tone-arms being respectively connected with two independent amplifying chambers or horns.

According to the present invention, a gramophone of the kind having two tone-arms connected rigidly together or formed integral, with their inner ends supported so that the said arms can swivel horizontally on a common axis and constructed at their outer ends so that the sound-box or boxes carried thereby can swivel vertically on the said arms, the inner ends of the connected tone-arms extenting in opposite directions in axial alignment to direct the sound therefrom into separate amplifying chambers, is characterized in that the said inner ends are mounted in two bearings on a common bracket or fitting, each bearing opening to an amplifying chamber.

In a suitable arrangement for carrying out the invention, the two connected tone-arms are preferably arranged side by side and have their inner ends extending in opposite directions in axial alignment, each such end being mounted in a bearing opening into or in open connection with an amplifying chamber, the two bearings being arranged on a common bracket.

The said inner ends are advantageously formed with flanges between which and the faces of the bearings are arranged anti-friction balls or the like. The usual tubular elbow extensions, on opposite sides of the dual sound-box enter sockets in the outer ends of the tone-arms and are hinged thereto to enable the said sound-box to swivel in the vertical plane.

To enable the invention to be fully understood, I will describe it by reference to the accompanying drawing, in which:—

Figures 1 and 2 are, respectively, a side view and a plan view of a pair of gramophone tone-arms and associated parts in accordance with the invention.

Figure 3:
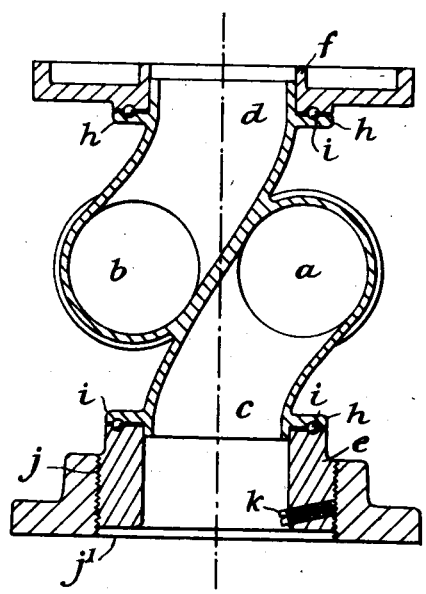
Figure 3 is a section on the line 3—3, Figure 1.

$a$, $b$ are the two tone-arms formed integral and arranged side by side and having their respective inner ends $c$, $d$ extending in opposite directions in axial alignment, as indicated clearly in Figure 3. $e$, $f$ are the bearings on the common bracket $g$ in which the ends $c$, $d$ are mounted so that the connected tone-arms can swivel horizontally and which bearings open into, or are in open connection with, independent amplifying chambers, not shown. $h$, $h$ are the flanges on the ends $c$, $d$ between which flanges and the faces of the bearings $e$, $f$ are arranged the anti-friction balls $i$, $i$ in suitable races. The lower bearing $e$ is separate from and adjustable with respect to the bracket $g$ to enable the connected tone-arms to be arranged in or removed from both bearings, it being screw-threaded as indicated at $j$ and screwing into a screw-threaded opening $j^1$ in the said bracket and being secured or locked in position therein by a screw $k$.

$l$ is the dual sound-box which may be provided with any conventional form of diaphragm arrangement associated with the stylus-holder $m$ and $n$, $o$ are the usual tubular elbow extensions on opposite sides of the said box conveying the sound to the tone-arms $a$ and $b$, respectively, the said extensions entering sockets $p$, $p$ in the outer ends of the said tone-arms and being hinged thereto as at $q$, $q$ to allow the sound-box to swivel in a vertical plane as the usual needle connected to the stylus bar $m$ rides in the needle track of a rotating record.

Claims:

1. In a sound reproducing machine, the combination with a tone arm having a pair of separate conduits for conveying sound waves, of an integrally formed bracket for journalling said tone arm for swinging movement, said bracket being provided with a pair of annular bearing portions each of which is adapted to encircle an end portion of one of said conduits.

2. In a sound reproducing machine, the combination with a tone arm having a pair of separate conduits for conveying sound waves, the outlet portions of said conduits being oppositely directed and substantially coaxial, and an integrally formed supporting bracket adapted for connection to separate amplifying chambers and having journal portions for engaging the outlet portions of the tone arm to permit swinging movement of the latter.

3. In a sound reproducing machine, the combination with a tone arm having a pair of integrally formed, substantially parallel conduits for conveying sound waves, the outlet portions of said conduits extending in opposite directions and being coaxially disposed, of an integrally formed U-shaped supporting bracket having legs adapted for connection with separate amplifying chambers, each leg being provided with an annular bearing for journalling one of said sound conduit outlet portions therein to permit swinging movement of the tone arm.

4. In a sound reproducing machine, the combination with a tone arm having a terminal portion comprising oppositely directed annular portions and integrally formed annular collars surrounding said annular portions adjacent the ends thereof, of an integrally formed supporting bracket having an aperture for receiving one of said annular portions, and an annular member having threaded connection with said bracket for receiving the other of said annular portions, said bracket and said member having bearing engagement with said collars for supporting said tone arm for swinging movement in a single plane.

WILLIAM CASBON.